United States Patent
Gjovik et al.

(10) Patent No.: US 11,826,959 B2
(45) Date of Patent: *Nov. 28, 2023

(54) FILAMENT BUFFER

(71) Applicant: Essentium, Inc., Pflugerville, TX (US)

(72) Inventors: Erik John Gjovik, Aliso Viejo, CA (US); Jason Greene, Huntington Beach, CA (US); William Jack MacNeish, III, Newport Beach, CA (US); Alex Stockton, Austin, TX (US)

(73) Assignee: ESSENTIUM IPCO, LLC, Pflugerville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/430,631

(22) PCT Filed: Feb. 6, 2020

(86) PCT No.: PCT/US2020/016983
§ 371 (c)(1),
(2) Date: Aug. 12, 2021

(87) PCT Pub. No.: WO2020/167577
PCT Pub. Date: Aug. 20, 2020

(65) Prior Publication Data
US 2022/0134663 A1    May 5, 2022

Related U.S. Application Data

(63) Continuation of application No. 16/273,825, filed on Feb. 12, 2019, now Pat. No. 11,034,090.

(51) Int. Cl.
*B29C 64/321* (2017.01)
*B29C 64/209* (2017.01)
(Continued)

(52) U.S. Cl.
CPC .......... *B29C 64/321* (2017.08); *B29C 64/118* (2017.08); *B29C 64/209* (2017.08);
(Continued)

(58) Field of Classification Search
None
See application file for complete search history.

(56) References Cited

U.S. PATENT DOCUMENTS 6,471,116 B2    10/2002    Copperthite
9,895,844 B2    2/2018    Haider et al.
(Continued)

FOREIGN PATENT DOCUMENTS

| CN | 203713074 U | 7/2014 |
|---|---|---|
| EP | 2445701 B1 | 2/2017 |
| WO | 2015027938 A1 | 3/2015 |

OTHER PUBLICATIONS

Supplementary European Search Report in Application No. 20755858.6, European Patent Office, dated Aug. 19, 2022, pp. 1-9
(Continued)

*Primary Examiner* — Yung-Sheng M Tsui
(74) *Attorney, Agent, or Firm* — Vivacqua Crane, PLLC

(57) ABSTRACT

A machine for manufacturing additive printed parts includes a first filament cartridge adapted to support a length of filament of a material from which the additive printed parts will be manufactured, a print head moveably supported within the machine, and a first filament buffer positioned between the first filament cartridge and the print head and including a first buffer volume. The filament supported within the first filament cartridge extends from the first filament cartridge, through the first filament buffer, and to the print head and is allowed to deflect within the first buffer volume.

18 Claims, 9 Drawing Sheets

(51) Int. Cl.
*B29C 64/118* (2017.01)
*B33Y 10/00* (2015.01)
*B33Y 40/00* (2020.01)
*B33Y 30/00* (2015.01)

(52) U.S. Cl.
CPC .............. *B33Y 10/00* (2014.12); *B33Y 30/00* (2014.12); *B33Y 40/00* (2014.12)

(56) References Cited

U.S. PATENT DOCUMENTS

| | | |
|---|---|---|
| 2014/0134335 A1 | 5/2014 | Behrens et al. |
| 2014/0291886 A1 | 10/2014 | Mark et al. |
| 2016/0052208 A1 | 2/2016 | Debora et al. |
| 2016/0136887 A1 | 5/2016 | Guillemette |
| 2017/0144373 A1 | 5/2017 | Erikson |
| 2017/0157826 A1 | 6/2017 | Hishiki |
| 2017/0361527 A1 | 12/2017 | Saarikoski |
| 2018/0009054 A1 | 1/2018 | Forseth et al. |
| 2018/0043629 A1 | 2/2018 | Koop et al. |
| 2018/0339486 A1 | 11/2018 | DiStefano et al. |
| 2019/0168436 A1 | 6/2019 | Wesselink |
| 2019/0168455 A1 | 6/2019 | Besim et al. |
| 2020/0122395 A1* | 4/2020 | Schroeder ............ B29C 64/209 |
| 2020/0223213 A1 | 7/2020 | Lower |

OTHER PUBLICATIONS

Chinese Office Action in Application No. 2020800136058, China National Intellectual Property Administration, dated Sep. 20, 2022, pp. 1-12.

* cited by examiner

FILAMENT BUFFER

CROSS-REFERENCE TO RELATED APPLICATIONS

This application is the National Stage of International Application No. PCT/US2020/016983, filed Feb. 6, 2020, and claims the benefit U.S. Non-Provisional patent application Ser. No. 16/273,825, filed Feb. 12, 2019, the disclosures of which are hereby incorporated by reference in their entirety.

INTRODUCTION

The present disclosure relates to machines that create additive printed parts and more particularly to a filament buffer for a machine that creates additive printed parts.

Machines for manufacturing additive printed parts generally include a print head that includes a feed motor to pull a filament of polymer material to the print head. The filament of polymer material is generally provided as a coiled spool that is contained remotely from the print head. The feed motor must pull with enough force to rotate the spool, unwind filament from the coil, and pull the filament to the print head. This force can be large depending on the type of filament and how big the coil of filament is. It is desirable to make the print head of such a machine as small as possible, thus, while current known machines achieve their intended purpose, there is a need for a new and improved machine for manufacturing additive printed parts where the force necessary to pull the polymer filament into the print head is minimized.

SUMMARY

According to several aspects of the present disclosure, a machine for manufacturing additive printed parts includes a first filament cartridge adapted to support a length of filament of a material from which the additive printed parts will be manufactured, a print head moveably supported within the machine, and a first filament buffer positioned between the first filament cartridge and the print head and including a first buffer volume. The filament supported within the first filament cartridge extends from the first filament cartridge, through the first filament buffer, and to the print head. The first buffer volume adapted to allow the filament passing through the first filament buffer to deflect.

In one aspect, the print head includes an extruder and a nozzle. The extruder is adapted to pull the filament from the first filament buffer into the print head and feed the filament into the nozzle.

In another aspect, the machine further includes a first feed motor mounted within and integral to the first filament buffer, positioned between the first filament cartridge and the first buffer volume. The first feed motor pulls the filament from the first filament cartridge and feeds it into the first buffer volume.

In another aspect, the first filament buffer includes a first opening and a second opening. Filament extending from the first filament cartridge enters the first filament buffer through the first opening and exits the first filament buffer through the second opening.

In another aspect, the first buffer volume is positioned between the first and second openings of the first filament buffer and includes a first sidewall and a second side wall, wherein the filament can deflect two-dimensionally between the first and second side walls.

In another aspect, the first side wall extends substantially linearly between the first and second openings and the second side wall extends between the first and second openings and includes a shape that allows the filament to deflect in the direction of the second side wall away from the first side wall. As the filament extends through the first buffer volume of the first filament buffer the filament deflects two-dimensionally between a first position, wherein the filament extends along a substantially linear path between the first and second openings adjacent the first side wall, and a second position, wherein the filament extends along a curved path between the first and second openings adjacent the second side wall.

In another aspect, the distance traveled by the filament between the first and second openings when the filament is adjacent the first side wall is shorter than the distance travelled by the filament between the first and second openings when the filament is adjacent the second side wall, wherein when the filament is deflected toward the second side wall there is slack in the filament within the buffer volume such that the force necessary to pull the filament into the print head by the extruder is not affected by any resistance applied to the filament up-stream of the buffer volume.

In another aspect, the machine further includes a first sensor and a second sensor mounted within the first filament buffer. The first sensor detects the presence of the filament within the first buffer volume when the filament is positioned adjacent the first side wall within the first buffer volume. The second sensor detects the presence of the filament within the first buffer volume when the filament is positioned adjacent the second side wall within the first buffer volume.

In another aspect, the machine further includes a spool rotatably mounted within the first filament cartridge that supports a coiled length of filament and is freely rotatable to allow filament to un-wind from the coil and to be pulled from the first filament cartridge.

In another aspect, the machine further includes a second filament cartridge, substantially identical to the first filament cartridge and adapted to support a length of the filament, a second feed motor mounted within and integral to the first filament buffer and positioned between the second filament cartridge and the first buffer volume, and a filament intersection positioned between the first and second feed motors and the first buffer volume of the first filament buffer. The filament intersection directs the filament extending, alternatively, from either the first or second filament cartridges into the first buffer volume of the first filament buffer.

In another aspect, the machine further includes a second filament cartridge, substantially identical to the first filament cartridge and adapted to support a length of the filament, and a second filament buffer positioned between the second filament cartridge and the print head and having a second buffer volume; wherein the filament supported within the second filament cartridge extends from the second filament cartridge, through the second filament buffer, and to the print head, and the second buffer volumes is adapted to allow the filament passing through the second filament buffer to deflect.

In another aspect, the machine further includes a second feed motor mounted within and integral to the second filament buffer and positioned between the second filament cartridge and the second buffer volume, wherein the filament supported within the second filament cartridge is pulled from the second filament cartridge and is fed into the second buffer volume by the second feed motor.

In another aspect, the second filament buffer includes a first opening and a second opening, wherein the filament extending from the second filament cartridge enters the second filament buffer through the first opening of the second filament buffer and exits the second filament buffer through the second opening of the second filament buffer.

In another aspect, the machine further includes a filament intersection positioned between the first and second filament buffers and the print head, wherein the filament intersection is adapted to direct the filament extending, alternatively, from either the first or second filament buffers to the print head.

In another aspect, the second buffer volume is positioned between the first and second openings of the second filament buffer and includes a first sidewall and a second side wall. The filament passing through the second buffer volume can deflect two-dimensionally between the first and second side walls of the second buffer volume.

In another aspect, the first side wall of the second buffer volume extends substantially linearly between the first and second openings of the second filament buffer and the second side wall of the second buffer volume extends between the first and second openings of the second filament buffer and is shaped to allow the filament to deflect two-dimensionally between a first position, wherein the filament extends along a substantially linear path between the first and second openings of the second filament buffer adjacent the first side wall of the second buffer volume, and a second position, wherein the filament extends along a curved path between the first and second openings of the second filament buffer adjacent the second side wall of the second buffer volume.

In another aspect, the distance traveled by the filament between the first and second openings of the second filament buffer when the filament is adjacent the first side wall of the second buffer volume is shorter than the distance travelled by the filament between the first and second openings of the second filament buffer when the filament is adjacent the second side wall of the second buffer volume, wherein when the filament is deflected toward the second side wall of the second buffer volume there is slack in the filament within the second buffer volume such that the force necessary to pull the filament into the print head by the extruder is not affected by any resistance applied to the filament up-stream of the second buffer volume.

In another aspect, the machine further includes a first sensor and a second sensor mounted within the second filament buffer to detect the presence of the filament within the second buffer volume when the filament is positioned adjacent the first side wall within the second buffer volume and the second sensor is adapted to detect the presence of the filament within the second buffer volume when the filament is positioned adjacent the second side wall within the second buffer volume.

In another aspect, the machine further includes a spool rotatably mounted within the second filament cartridge and adapted to support a coiled length of the filament and to rotate freely to allow filament to un-wind from the coil and to be pulled from the second filament cartridge.

According to several aspects of the present disclosure, a machine for manufacturing additive printed parts includes a plurality of filament cartridges, a print head moveably supported within the machine, and a plurality of filament buffers. Each of the plurality of filament cartridges includes a spool rotatably mounted therein, wherein the spool within each of the plurality of filament cartridges supports a coiled length of filament of a material from which the additive printed parts will be manufactured and rotates freely to allow the filament to un-wind from the coil and to be pulled from the filament cartridge. The print head has an extruder and a nozzle mounted within the print head, wherein the extruder pulls the filament from the plurality of filament cartridges into the print head and feeds the filament into the nozzle. Each of the plurality of filament buffers is positioned between one of the plurality of filament cartridges and the print head, and includes a first opening, a second opening, a buffer volume positioned between the first and second openings, and a feed motor. The filament is pulled from a one of the plurality of filament cartridges and fed into the first opening of each of the filament buffers by the feed motor within each of the plurality of filament buffers, extends through the buffer volume of each of the filament buffers, is allowed to deflect within the buffer volume of each of the plurality of filament buffers as the filament passes through each of the plurality of filament buffers, exits each of the filament buffers through the second opening of each of the plurality of filament buffers and extends from each of the filament buffers to the print head.

In another aspect, the buffer volume of each of the plurality of filament buffers includes a first sidewall extending substantially linearly between the first and second openings and a second side wall extending between the first and second openings having a shape that allows the filament to deflect in the direction of the second side wall away from the first side wall, wherein as the filament extends through the buffer volume of each of the plurality of filament buffers the filament deflects two-dimensionally between a first position, wherein the filament extends along a substantially linear path between the first and second openings adjacent the first side wall, and a second position, wherein the filament extends along a curved path between the first and second openings adjacent the second side wall.

In another aspect, within each of the plurality of filament buffers, the distance traveled by the filament between the first and second openings when the filament is adjacent the first side wall is shorter than the distance travelled by the filament between the first and second openings when the filament is adjacent the second side wall, wherein when the filament is deflected toward the second side wall there is slack in the filament within the buffer volume such that the force necessary to pull the filament into the print head by the extruder is not affected by any resistance applied to the filament up-stream of the buffer volume.

In another aspect, each of the plurality of filament buffers includes a first sensor mounted adjacent the first side wall and a second sensor mounted adjacent the second side wall, wherein the first sensor is adapted to detect the presence of the filament when the filament is in close proximity to the first side wall and the second sensor is adapted to detect the presence of the filament when the filament is in close proximity to the second side wall.

According to several aspects of the present disclosure, a filament buffer for additive printed part manufacturing includes a first opening and a second opening, wherein a filament of building material for an additive printed part is fed into the filament buffer through the first opening and exits the filament buffer through the second opening, and a buffer volume is positioned between the first and second openings to provide a space into which the filament can deflect.

In another aspect, the filament buffer further includes a feed motor adapted to pull the filament into the filament buffer and feed the filament into the buffer volume.

In another aspect, the buffer volume is positioned between the first and second openings and includes a first sidewall and a second side wall, wherein the filament can deflect two-dimensionally between the first and second side walls.

In another aspect, the first side wall extends substantially linearly between the first and second openings and the second side wall extends between the first and second openings and includes a deep curved shape that allows the filament to deflect in the direction of the second side wall, such that as the filament extends through the buffer volume the filament deflects two-dimensionally between a first position, wherein the filament extends along a substantially linear path between the first and second openings adjacent the first side wall, and a second position, wherein the filament extends along a curved path between the first and second openings adjacent the second side wall.

In another aspect, the distance traveled by the filament between the first and second openings when the filament is adjacent the first side wall is shorter than the distance travelled by the filament between the first and second openings when the filament is adjacent the second side wall, wherein when the filament is deflected toward the second side wall there is slack in the filament within the buffer volume such that the force necessary to pull the filament out of the filament buffer through the second opening is not affected by any resistance applied to the filament up-stream of the buffer volume.

In another aspect, the filament buffer further includes first and second sensors mounted therein, the first sensor being adapted to detect the presence of the filament when the filament is adjacent the first side wall and the second sensor adapted to detect the presence of the filament when the filament is adjacent the second side wall.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 100 is a schematic view of a machine for manufacturing additive printed parts according to an exemplary embodiment having two filament cartridges and two filament buffers.

DETAILED DESCRIPTION

The following description is merely exemplary in nature and is not intended to limit the present disclosure, application, or uses.

Figure 1:
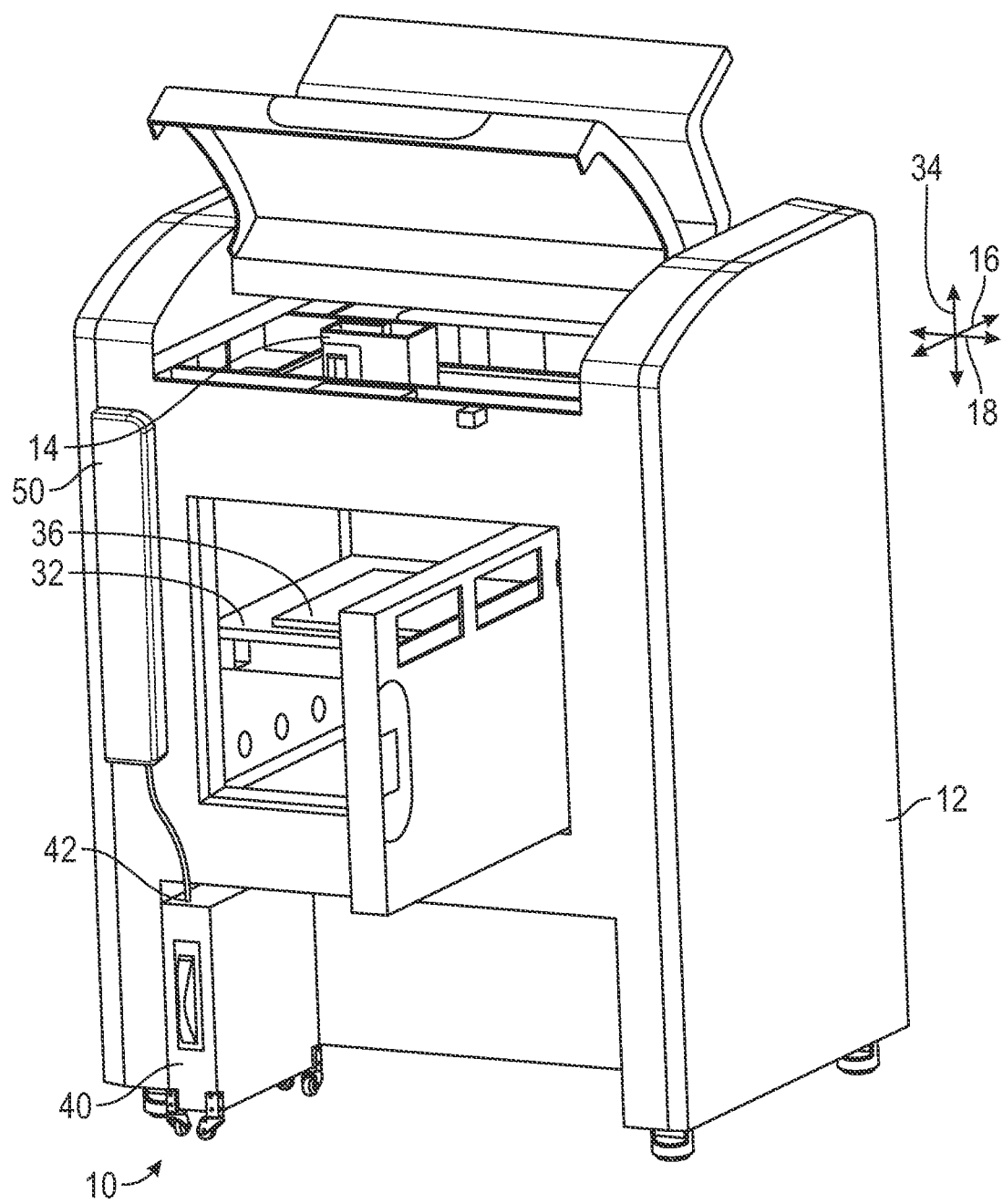
FIG. 1 is a perspective view of a machine for manufacturing additive printed parts according to an exemplary embodiment.

Referring to FIG. 1, a machine for manufacturing additive printed parts from a polymer material is shown generally at 10. The machine 10 includes a housing 12 within which components of the machine 10 are supported. The machine 10 includes a print head 14, a first filament cartridge 40, and a first filament buffer 50. The first filament buffer 50 is positioned between the first filament cartridge 40 and the print head 14. A filament 26 extends from the first filament cartridge 40 passes through the first filament buffer 50 and then on to the print head 14.

Figure 2:
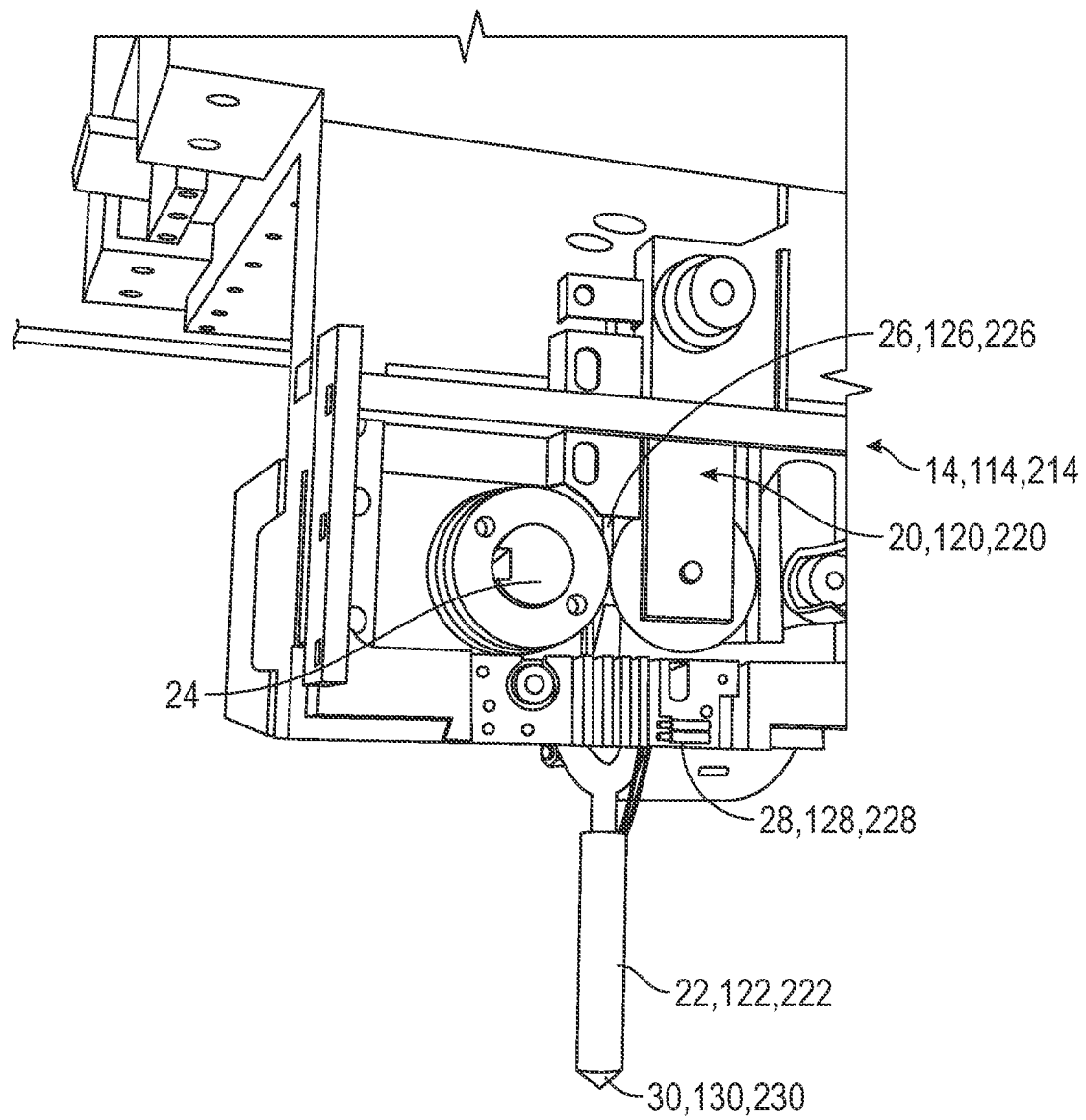
FIG. 2 is a perspective view of a print head for the machine according to an exemplary embodiment.

Referring to FIG. 2, the print head is shown generally at 14. The print head 14 is moveable two-dimensionally in a horizontal plane along an x-axis 16 and a y-axis 18 within the housing 12 and includes an extruder 20 and a nozzle 22. The extruder 20 includes a print head feed motor 24 and is adapted to pull the filament 26 into the print head 14. The extruder 20 then feeds the filament 26 to the nozzle 22. The nozzle 22 includes a heater 28 that melts the filament 26 as it enters the nozzle 22. The nozzle 22 also includes a tip 30 adapted to feed molten filament material out of the nozzle 22 to be deposited when an additive printed part is being created. Continual feeding of the filament 26 into the nozzle 22 by the extruder 20 pushes the molten filament material through the tip 30 of the nozzle 22 to be deposited.

Referring again to FIG. 1, a build table 32 is supported below the print head 14 and is vertically movable up and down along a z-axis 34. The build table 32 also includes a print bed 36. The print bed 36 provides a surface onto which an additive printed part is created within the machine 10. When the machine 10 is used to create an additive printed part, the build table 32 starts out positioned high within the machine 10 near the print head 14. The print head 14 moves back and forth two dimensionally along the x-axis 16 and y-axis 18 depositing molten polymer material onto the print bed 36 and creating a two-dimensional shape on the print bed 36. Once fed from the tip 30 of the nozzle 22 the molten filament material quickly hardens sufficiently to hold shape. The build table 32 gradually moves downward along the z-axis 34 away from the print head 14 as successive layers of molten material are deposited on previously deposited layers of hardened material. The print head 14 continues to add successive layers onto the forming additive printed part until a final three-dimensional shape is formed.

Figure 4:
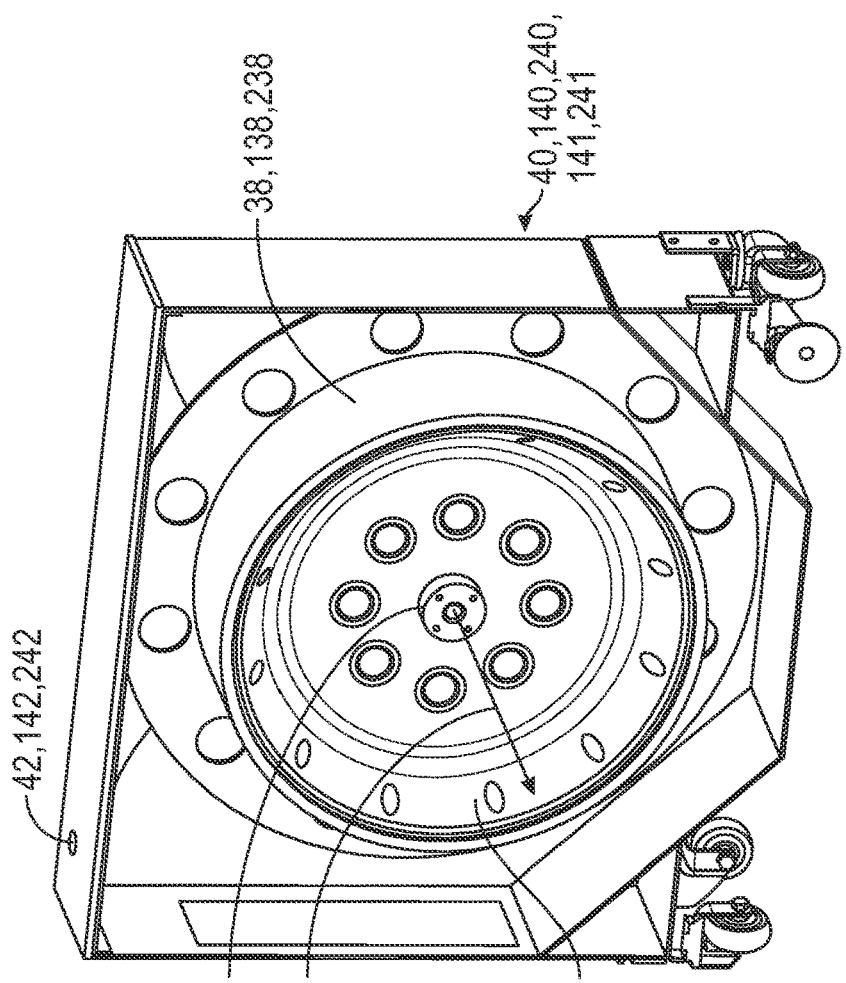
FIG. 4 is an internal view of a filament cartridge for the machine according to an exemplary embodiment.
Figure 3:
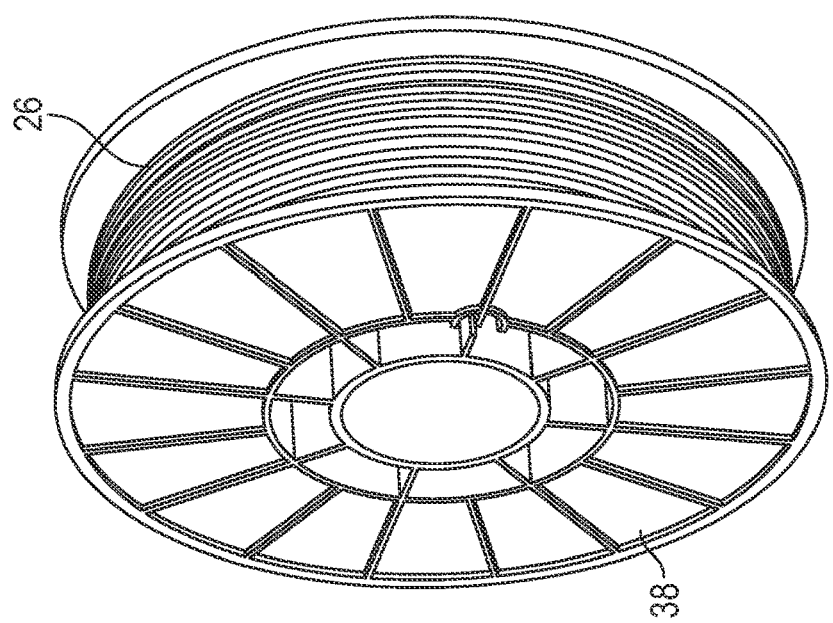
FIG. 3 is a perspective view of a spool and coil of filament for the machine according to an exemplary embodiment.
Figure 6A:
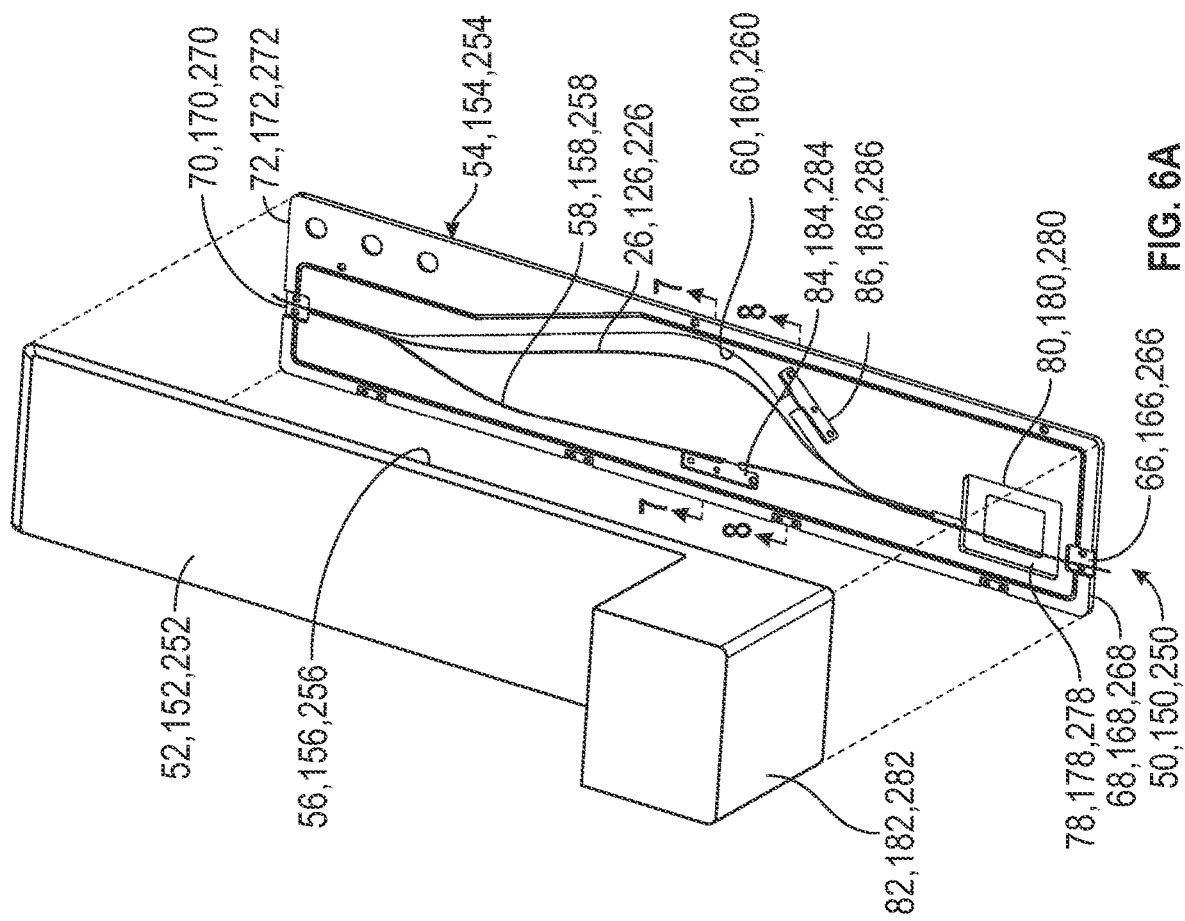
FIG. 6A is an exploded view of the buffer body, cover, and feed motor for a filament buffer according to an exemplary embodiment.
Figure 5:
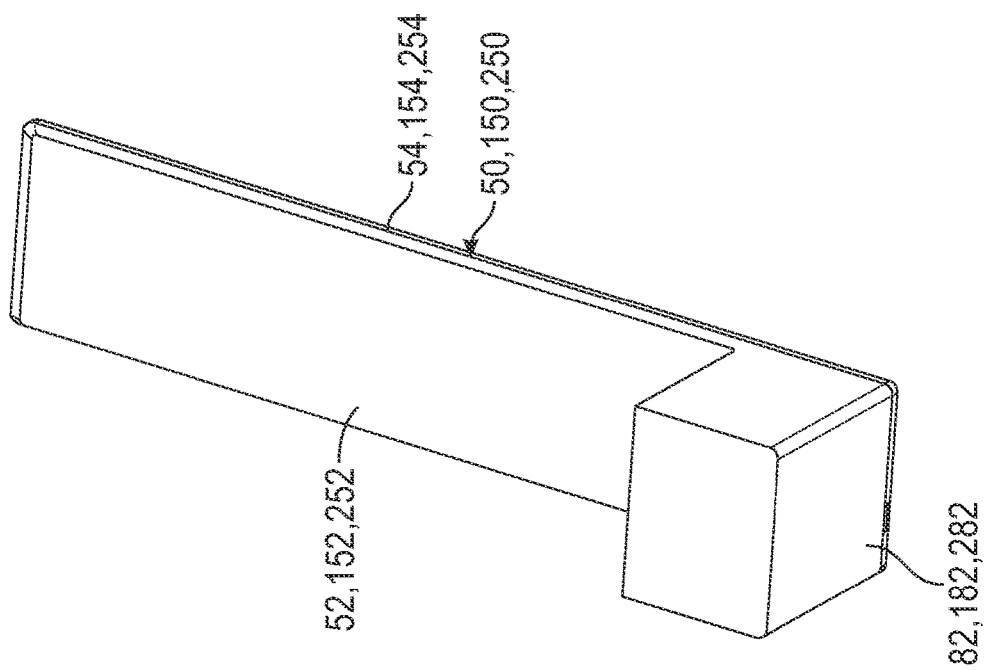
FIG. 5 is a perspective view of a filament buffer for the machine according to an exemplary embodiment.
Figure 6B:
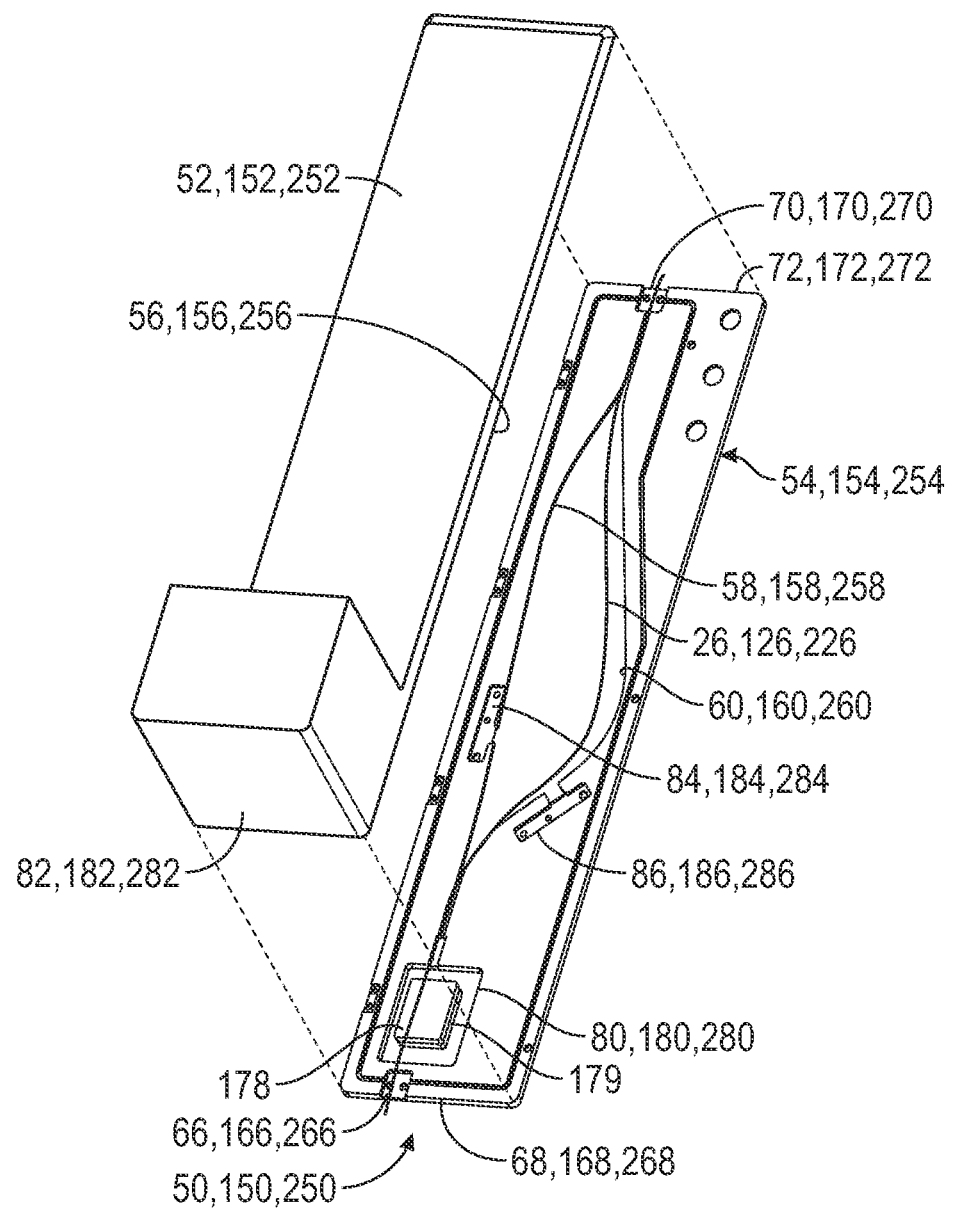
FIG. 6B is an exploded view of the buffer body, cover, and feed motors for a filament buffer according to an exemplary embodiment.
Figure 6C:
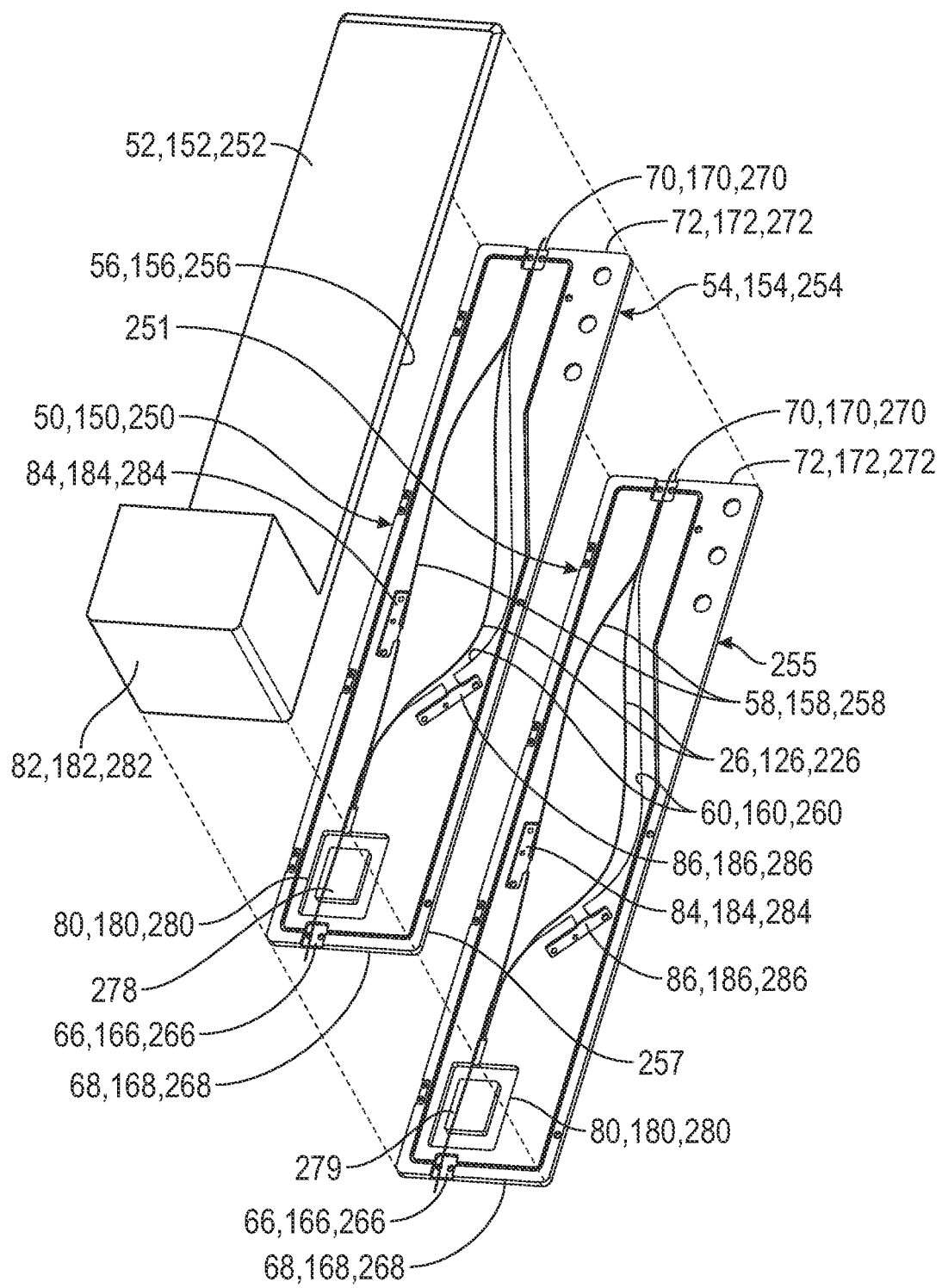
FIG. 6C is an exploded view of two filament buffers in a stacked arrangement.
Figure 7:
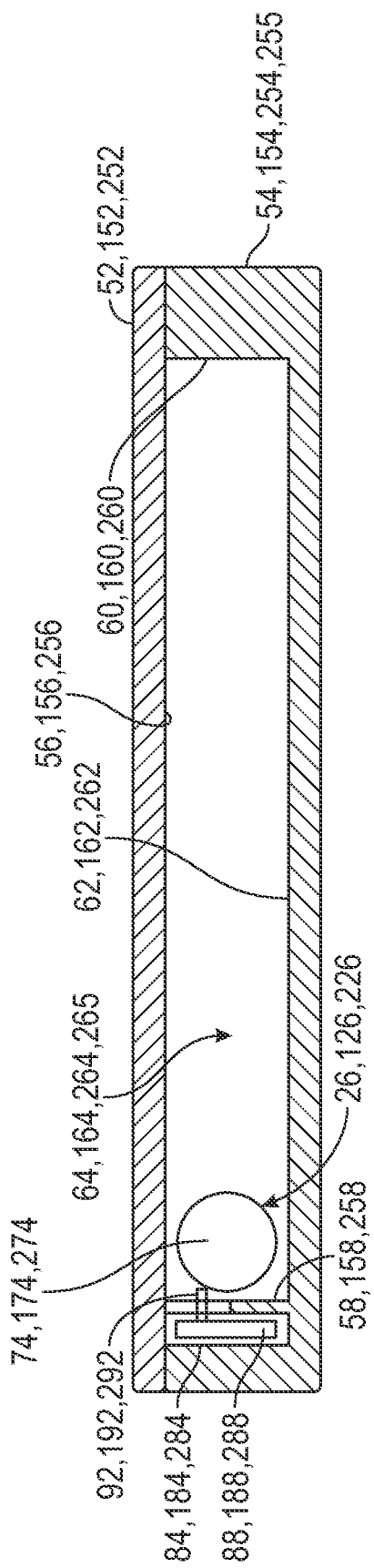
FIG. 7 is a cross sectional view as indicated by arrows 7-7 in FIG. 6A.
Figure 8:
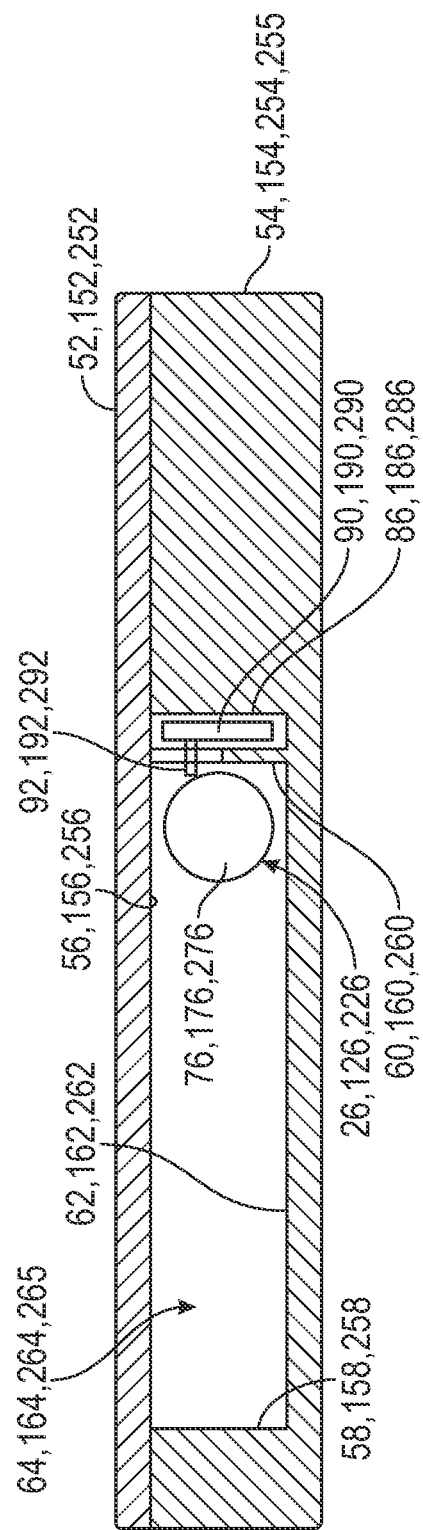
FIG. 8 is a cross sectional view as indicated by arrows 8-8 in FIG. 6A.

The machine 10 can create additive printed parts from different kinds of material. In an exemplary embodiment the filament 26 is made from a polymer material. The filament 26 can have varying size, color and material composition. The filament 26 that the machine 10 uses comes coiled onto a spool 38, as shown in FIG. 3. Referring to FIGS. 1 and 4, the first filament cartridge 40 supports the spool 38 of filament 26 so the filament 26 can be fed into the machine 10 to the print head 14. The spool 38 is rotatably supported within the first filament cartridge 40. FIG. 4 shows the interior of the first filament cartridge 40 with an empty spool 38 supported therein. The first filament cartridge 40 includes an opening 42 formed therein to allow the filament 26 to extend out of the first filament cartridge 40. The spool 38 is supported co-axially on a hub 44. The hub 44 is rotatably supported to allow both the hub 44 and the spool 38 supported on the hub 44 to rotate about a center axis 46. Preferably, the hub 44 is supported within the first filament cartridge in a manner that allows the hub 44 and spool 38 to freely rotate. In the first filament cartridge 40 shown in FIG. 4, the hub 44 is supported within the first filament cartridge by a bearing 48. Free rotation of the hub 44 within the first filament cartridge 40 is important to ensure the filament 26 can easily unwind from the spool and minimize the amount of force necessary to pull the filament 26 from the first filament cartridge 40.

In order to minimize mass and optimize packaging, it is desirable that the print head 14 be as small as possible. The extruder 20 within the print head 14 pulls the filament 26 from the first filament cartridge 40 into the print head 14 and feeds the filament 26 to the nozzle 22. Because the print head 14 must be small, the extruder 20 is also relatively small. In general, the force necessary to rotate the spool 38 and unwind the coil of filament 26 is on the order of ten times the force that the extruder 20 pulls the filament into the print head 14. Therefore, it is desirable to minimize the force necessary to pull the filament 26 into the print head 14.

Referring to FIG. 1, a first filament buffer 50 is positioned between the first filament cartridge 40 and the print head 14. Filament 26 extending from the first filament cartridge 40 passes through the first filament buffer 50 and then on to the print head 14. Referring to FIGS. 5, 6A, 7 & 8, the first filament buffer 50 includes a cover 52 and a first buffer body 54. The cover 52 of the first filament buffer 50 is adapted to be attached to the first buffer body 54 and has a cover face 56 that mates to the first buffer body 54. The first buffer body 54 includes a cavity 56 formed therein. The cavity 56 is defined by a first side wall 58, a second side wall 60, and a bottom wall 62 formed within the first buffer body 54. When the cover 52 is attached to the first buffer body 54, the first sidewall 58, the second side wall 60, the bottom wall 62 and the cover face 56 define a first buffer volume 64. The first buffer volume 64 allows the filament 26 passing through the first filament buffer 50 to deflect. Deflection of the filament 26 within the first filament buffer 50 creates slack in the length of filament 26 between the first filament cartridge 40 and the print head 14.

Figure 10A:
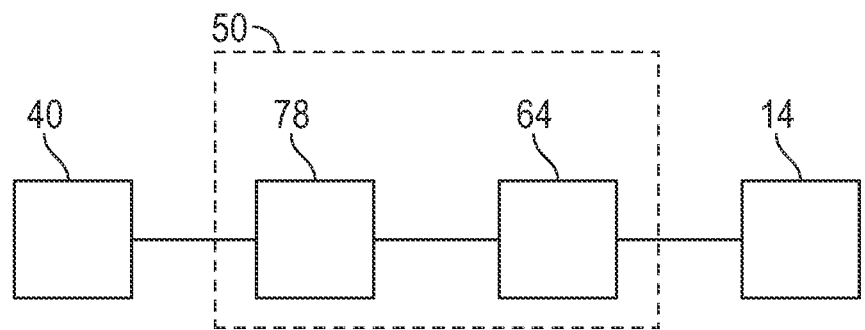
FIG. 10A is a schematic view of a machine for manufacturing additive printed parts according to an exemplary embodiment having one filament cartridge and one filament buffer.

The first filament buffer includes a first opening 66 formed at a first distal end 68 and a second opening 70 formed at a second distal end 72. The filament 26 from the first filament cartridge 40 enters the first filament buffer 50 through the first opening 66 and exits the first filament buffer 50 through the second opening 70 to extend onward to the print head 14. The first buffer volume 64 is positioned between the first and second openings 66, 70 of the first filament buffer 50. FIG. 10A is a schematic representation of the path the filament 26 takes as it is pulled from the first filament cartridge 40 by the first feed motor 78 and fed through the first filament buffer 50 and finally to the print head 14

The first side wall 58 extends substantially linearly between the first and second openings 66, 70. The second side wall 60 extends between the first and second openings 66, 70 and includes a concave curved shape that allows the filament 26 to deflect in the direction of the second side wall 60 away from the first side wall 58. The exact shape of the second side wall 60 is similar to a tear drop. Beginning near the first opening 66 the second side wall 60 slopes sharply away from the first side wall 58. At a point where the width of the first buffer volume 64 between first and second side walls 58, 60 is largest, the second side wall turns back toward the first side wall 58 and gradually moves closer to the first side wall 58 as the second side wall 60 extends to the second opening 70 within the first filament buffer 50. The shape of the second side wall 60 is similar to the shape to which the filament 26 will naturally deflect. This shape is important to ensure the filament 26 can easily deflect within the buffer volume 64 and that the filament 26 will move smoothly through the first buffer volume 64.

As the filament 26 extends through the first buffer volume 64 the filament 26 deflects two-dimensionally between a first position 74 and a second position 76. In the first position 74, the filament 26 extends along a substantially linear path between the first and second openings 66, 70 adjacent the first side wall 58. In the second position 76, the filament 26 extends along a curved path between the first and second openings 66, 70 adjacent the second side wall 60.

When the filament 26 deflects to the second position 76, there is slack in the filament 26, adding to the length of filament 26 within the first buffer volume 64. The distance traveled by the filament 26 between the first and second openings 66, 70 when the filament 26 is adjacent the first side wall 58 is shorter than the distance travelled by the filament 26 between the first and second openings 66, 70 when the filament 26 is adjacent the second side wall 60. When the extruder 20 within the print head 14 pulls the filament 26 into the print head 14, the extruder 20 must pull with enough force to overcome all frictional resistance acting on the filament 26 upstream of the extruder 20. This can be particularly problematic if the spool 38 of coiled filament 26 is very large. The extruder 20 within the print head 14 must pull with enough force to rotate the spool 38 and un-wind the filament 26 from the coil. If the force is too much, the extruder 20 may not be able to pull with enough force to overcome frictional resistance. If this happens, the machine 10 will stop functioning. Alternatively, if the resistance is too much, the print head feed motor 24 within the extruder 20 may strip the surface of the filament 26 causing slippage in the extruder 20. Either instance results in a disruption in the operation of the machine 10.

If the filament 26 is deflected away from the first side wall 58 toward the second position 76, adjacent the second side wall 60 within the first buffer volume 64, there is slack in the filament 26 within the first buffer volume 64. This slack provides a free length of filament 26 within the first buffer volume 64 that can be pulled from the first buffer volume 64 with little resistance. When the filament 26 is deflected away from the first side wall 58 and there is slack in the filament 26 within the first buffer volume 64, the force necessary to pull the filament 26 into the extruder 20 within the print head 14 is not affected by any frictional resistance applied to the filament 26 up-stream of the first buffer volume 64.

A first feed motor 78 is mounted within and integral to the first filament buffer 50. The first buffer body 54 includes a cavity 80 within which the first feed motor 78 is positioned, and the cover 52 is shaped to provide a housing 82 for the first feed motor 78 when the cover 52 is attached to the first buffer body 54. The first feed motor 78 pulls the filament 26 from the first filament cartridge 40 and into the first opening 66. The first feed motor 78 also pushes the filament 26 into the first buffer volume 64.

The first feed motor 78 pulls the filament 26 from the first filament cartridge 40 and pushes the filament 26 into the first buffer volume 64 faster than the extruder 20 pulls the filament 26 from the first filament buffer 50. Because the filament 26 is coming into the first buffer volume 64 faster than the filament 26 is exiting the first buffer volume 64, the filament 26 is forced to deflect within the first buffer volume 64.

The first buffer body 54 includes two sensor pockets 84, 86. A first sensor pocket 84 is formed within the first side wall 58 of the first buffer volume 64 and a second sensor pocket 86 is formed within the second side wall 60 of the first buffer volume 64. The sensor pockets 84, 86 are adapted to support first and second sensors 88, 90 to detect the presence of the filament 26. The sensors 88, 90 can be mechanical, wherein the sensors 88, 90 include a mechanical switch 92 extending into the first buffer volume 64 that is triggered when the filament 26 comes into physical contact with the mechanical switch 92. Alternatively, the sensors 88, 90 can be optical sensors that are triggered when the filament 26 is near the sensors 88, 90.

The sensors 88, 90 provide feedback to allow proper control of the machine 10. The machine 10 runs optimally when the filament 26 extending through the first filament buffer 50 is deflected within the first buffer volume 64. Deflection is accomplished due to the first feed motor 78 pushing the filament 26 into the first buffer volume 64 faster than the filament 26 is being pulled from the first filament buffer 50. The sensors 88, 90 detect the presence of the filament 26 within the first buffer volume 64 and provide that information to the controls of the machine 10.

If the filament 26 extending through the first filament buffer 50 is not deflected within the first buffer volume 64, the first sensor 88 will detect the filament 26 adjacent the first side wall 58. If the first sensor 88 detects the presence of the filament 26, the first feed motor 78 is turned on. The first feed motor 78 feeds filament 26 into the first buffer volume 64 faster than the filament 26 is being pulled from the first buffer volume 64 causing the filament 26 to deflect. When the filament 26 has fully deflected within the first buffer volume 64, the filament 26 will trigger the second sensor 90. When the second sensor 90 is triggered, the first feed motor 78 is turned off. As the machine continues to operate, the extruder 20 in the print head 14 pulls filament 26 from the first filament buffer 64, taking up the slack in the filament 26 and causing less deflection of the filament 26. When all slack in the filament 26 is gone, the filament 26 is no longer deflected and is adjacent the first side wall 58. When the first sensor 88 once again detects that the filament 26 is adjacent the first side wall 58, the first feed motor 78 is once again turned on. This cycle is repeated as the machine 10 operates. With feedback from the first and second sensors 88, 90, the first feed motor 78 cycles on and off as necessary to maintain deflection of the filament 26 within the first buffer volume 64.

Figure 9:
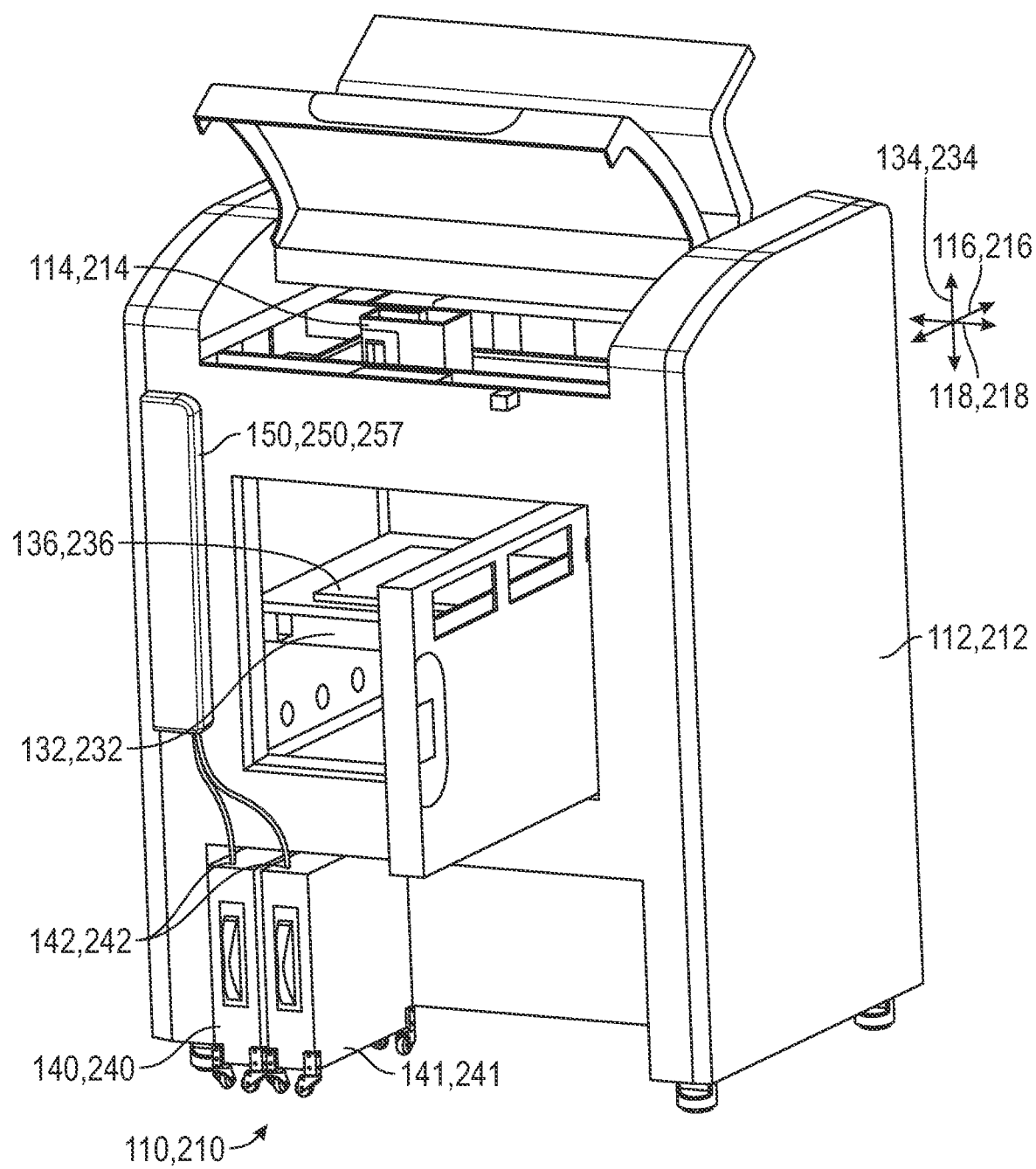
FIG. 9 is a perspective view of a machine for manufacturing additive printed parts according to an exemplary embodiment.

Referring to FIG. 9, in another aspect of the present disclosure, a machine for manufacturing additive printed parts from a polymer material is shown generally at 110. The machine 110 includes a housing 120 within which components of the machine 110 are supported. The machine 110 includes a print head 114 that is moveable two-dimensionally in a horizontal plane along an x-axis 116 and a y-axis 118 within the housing 112.

Referring to FIG. 2, The print head is shown generally at 114. The print head 114 includes an extruder 120 and a nozzle 122. The extruder 120 includes a print head feed motor 124 and is adapted to pull a filament of polymer material 126 into the print head 114. The extruder 120 then feeds the filament 126 to the nozzle 122. The nozzle 122 includes a heater 128 that melts the filament 126 as it enters the nozzle 122. The nozzle 122 also includes a tip 130 adapted to feed molten polymer material out of the nozzle 122 to be deposited when an additive printed part is being created. Continual feeding of the filament 126 into the nozzle 122 by the extruder 120 pushes the molten polymer material through the tip 130 of the nozzle 122 to be deposited.

Referring again to FIG. 9, a build table 132 is supported below the print head 114 and is vertically movable up and down along a z-axis 134. The build table 132 also includes a print bed 136. The print bed 136 provides a surface onto which an additive printed part is created within the machine 110. When the machine 110 is used to create an additive printed part, the build table 132 starts out positioned high within the machine 110 near the print head 114. The print head 114 moves back and forth two dimensionally along the x-axis 116 and y-axis 118 depositing molten polymer material onto the print bed 136 and creating a two-dimensional shape on the print bed 136. Once fed from the tip 130 of the nozzle 122 the molten polymer material quickly hardens sufficiently to hold shape. The build table 132 gradually moves downward along the z-axis 134 away from the print head 114 as successive layers of molten material are deposited on previously deposited layers of hardened polymer material. The print head 114 continues to add successive layers onto the forming additive printed part until a final three-dimensional shape is formed.

The machine 110 can create additive printed parts from different kinds of polymer material. The filament 126 can have varying size, color and material composition. The filament 126 that the machine 110 uses comes coiled onto a spool 138, as shown in FIG. 3. Referring to FIGS. 9 and 4, a first filament cartridge 140 supports a spool 138 of filament 126 so the filament 126 can be fed into the machine 110 to the print head 114. A second filament cartridge 141, identical to the first filament cartridge 140, supports an identical spool 138 of filament 126 so the filament 126 can be fed into the machine 110 to the print head 114. The spools 138 are rotatably supported within the first and second filament cartridges 140, 141. FIG. 4 shows the interior of the first and second filament cartridges 140, 141 with an empty spool 138 supported therein. The first and second filament cartridges 140, 141 each include an opening 142 formed therein to allow the filament 126 to extend out. The spool 138 is supported co-axially on a hub 144. The hub 144 is rotatably supported to allow both the hub 144 and the spool 138 supported on the hub 144 to rotate about a center axis 146. Preferably, the hub 144 is supported in a manner that allows the hub 144 and spool 138 to freely rotate. In the first and second filament cartridges 140, 141 as shown in FIG. 4, the hub 144 is supported within the each of the first and second filament cartridges 140, 141 by a bearing 148. Free rotation of the hub 144 within each of the first and second filament cartridges 140, 141 is important to ensure the filament 126 can easily unwind from the spool 138 and minimize the amount of force necessary to pull the filament 126 from the first and second filament cartridges 140, 141.

In order to minimize mass and optimize packaging, it is desirable that the print head 114 be as small as possible. The extruder 120 within the print head 114 pulls the filament 126 from the first filament cartridge 140 into the print head 114 and feeds the filament 126 to the nozzle 122. Because the print head 114 must be small, the extruder 120 is also relatively small. Therefore, it is desirable to minimize the force necessary to pull the filament 126 into the print head 114.

Referring to FIG. 9, a first filament buffer 150 is positioned between the first and second filament cartridges 140, 141 and the print head 114. Filament 126 extending from the first and second filament cartridges 140, 141 passes through the first filament buffer 150 and then on to the print head 114. Referring to FIGS. 5, 6B, 7 & 8, the first filament buffer 150 includes a cover 152 and a first buffer body 154. The cover 152 of the first filament buffer 150 is adapted to be attached to the first buffer body 154 and has a cover face 156 that mates to the first buffer body 154. The first buffer body 154 includes a cavity 156 formed therein. The cavity 156 is defined by a first side wall 158, a second side wall 160, and a bottom wall 162 formed within the first buffer body 154. When the cover 152 is attached to the first buffer body 154, the first sidewall 158, the second side wall 160, the bottom wall 162 and the cover face 156 define a first buffer volume 164. The first buffer volume 164 allows the filament 126 passing through the first filament buffer 150 to deflect. Deflection of the filament 126 within the first filament buffer 150 creates slack in the length of filament 126 between the first and second filament cartridges 140, 141 and the print head 114.

The first filament buffer 150 includes a first opening 166 formed at a first distal end 168 and a second opening 170 formed at a second distal end 172. The filament 126 from the first and second filament cartridges 140, 141 enters the first filament buffer 150 through the first opening 166 and exits the first filament buffer 150 through the second opening 170 to extend onward to the print head 114. The first buffer volume 164 is positioned between the first and second openings 166, 170 of the first filament buffer 150.

The first side wall 158 extends substantially linearly between the first and second openings 166, 170. The second side wall 160 extends between the first and second openings 166, 170 and includes a concave curved shape that allows the filament 126 to deflect in the direction of the second side wall 160 away from the first side wall 158. As the filament 126 extends through the first buffer volume 164 the filament 126 deflects two-dimensionally between a first position 174 and a second position 176. In the first position 174, the filament 126 extends along a substantially linear path between the first and second openings 166, 170 adjacent the first side wall 158. In the second position 176, the filament 126 extends along a curved path between the first and second openings 166, 170 adjacent the second side wall 160.

When the filament 126 deflects to the second position 176, there is slack in the filament 126, adding to the length of filament 126 within the first buffer volume 164. The distance traveled by the filament 126 between the first and second openings 166, 170 when the filament 126 is adjacent the first side wall 158 is shorter than the distance travelled by the filament 126 between the first and second openings 166, 170 when the filament 126 is adjacent the second side wall 160. When the extruder 120 within the print head 114 pulls the filament 126 into the print head 114, the extruder 120 must pull with enough force to overcome all frictional resistance acting on the filament 126 upstream of the extruder 120. This can be particularly problematic if the spool 138 of coiled filament 126 is very large. The extruder 120 within the print head 114 must pull with enough force to rotate the spool 138 and un-wind the filament 126 from the coil. If the force is too much, the extruder 120 may not be able to pull with enough force to overcome frictional resistance. If this happens, the machine 110 will stop functioning. Alternatively, if the resistance is too much, the print head feed motor 124 within the extruder 120 may strip the surface of the filament 126 causing slippage in the extruder 120. Either instance results in a disruption in the operation of the machine 110.

If the filament 126 is deflected away from the first side wall 158 toward the second position 176, adjacent the second side wall 160 within the first buffer volume 164, there is slack in the filament 126 within the first buffer volume 164. This slack provides a free length of filament 126 within the first buffer volume 164 that can be pulled from the first buffer volume 164 with little resistance. When the filament 126 is deflected away from the first side wall 158 and there is slack in the filament 126 within the first buffer volume 164, the force necessary to pull the filament 126 into the extruder 120 within the print head 114 is not affected by any frictional resistance applied to the filament 126 up-stream of the first buffer volume 164.

Figure 10B:
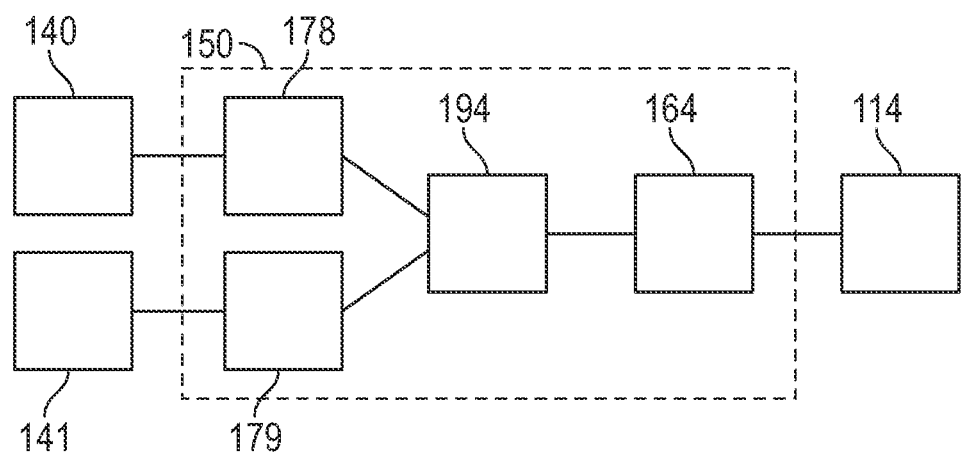
FIG. 10B is a schematic view of a machine for manufacturing additive printed parts according to an exemplary embodiment having two filament cartridges and one filament buffer.

A first feed motor 178 and a second feed motor 179 are mounted within and integral to the first filament buffer 150. The first buffer body 154 includes a cavity 180 within which the first and second feed motors 178, 179 are positioned, and the cover 152 is formed to provide a housing 182 for the first and second feed motors 178, 179 when the cover 152 is attached to the first buffer body 154. A filament intersection 194 is positioned between the first and second feed motors 178, 179 and the first buffer volume 164. The first feed motor 178 pulls filament 126 from the first filament cartridge 140 and feeds the filament 126 to the filament intersection 194. The second feed motor 179 pulls filament 126 from the second filament cartridge 141 and feeds the filament 126 to the filament intersection 194. FIG. 10B is a schematic representation of the path the filament 126 takes through the machine 110.

The filament intersection 194 is adapted to alternatively allow filament 126 from the first and second filament cartridges 140, 141 to be fed into the first buffer volume 164 of the first filament buffer 150. The filament intersection 194 allows the filament 126 to be pulled from either the first filament cartridge 140 or the second filament cartridge 141. This provides the ability to have more or different filament readily available to the machine 110. When the filament 126 from the first filament cartridge 140 runs out, the filament intersection 194 can allow filament 126 from the second filament cartridge 140 to be fed into the first filament buffer 150 with minimal interruption to the machine 110.

The feed motors 178, 179 pull the filament 126 from the filament cartridges 140, 141 and push the filament 126 into the first buffer volume 164 faster than the extruder 120 pulls the filament 126 from the first filament buffer 150. Because the filament 126 is coming into the first buffer volume 164 faster than the filament 126 is exiting the first buffer volume 164, the filament 126 is forced to deflect within the first buffer volume 164.

The first buffer body 154 includes two sensor pockets 184, 186. A first sensor pocket 184 is formed within the first side wall 158 of the first buffer volume 164 and a second sensor pocket 186 is formed within the second side wall 160 of the first buffer volume 164. The sensor pockets 184, 186 are adapted to support first and second sensors 188, 190 to detect the presence of the filament 126. The sensors 188, 190 can be mechanical, wherein the sensors 188, 190 include a mechanical switch 192 extending into the first buffer volume 164 that is triggered when the filament 126 comes into physical contact with the mechanical switch 192. Alternatively, the sensors 188, 190 can be optical sensors that are triggered when the filament 126 is in close proximity to the sensors 188, 190.

The sensors 188, 190 provide feedback to allow proper control of the machine 110. The machine 110 runs optimally when the filament 126 extending through the first filament buffer 150 is deflected within the first buffer volume 164. Deflection is accomplished due to the first feed motor 178 pushing the filament 126 into the first buffer volume 164 faster than the filament 126 is being pulled from the first filament buffer 150. The sensors 188, 190 detect the presence of the filament 126 within the first buffer volume 164 and provide that information to the controls of the machine 110.

If the filament 126 extending through the first filament buffer 150 is not deflected within the first buffer volume 164, the first sensor 188 will detect the filament 126 adjacent the first side wall 158. If the first sensor 188 detects the presence of the filament 126, the first or second feed motor 178, 179 is turned on. The first or second feed motor 178, 179 feeds filament 26 into the first buffer volume 164 faster than the filament 126 is being pulled from the first buffer volume 164 causing the filament 126 to deflect. When the filament 126 has fully deflected within the first buffer volume 164, the filament 126 will trigger the second sensor 190. When the second sensor 190 is triggered, the first or second feed motor 178, 179 is turned off. As the machine continues to operate, the extruder 120 in the print head 114 pulls filament 126 from the first filament buffer 164, taking up the slack in the filament 126 and causing less deflection of the filament 126. When all slack in the filament 126 is gone, the filament 126 is no longer deflected and is adjacent the first side wall 158. When the first sensor 188 once again detects that the filament 126 is adjacent the first side wall 158, the first or second feed motor 178, 179 is once again turned on. This cycle is repeated as the machine 110 operates. With feedback from the first and second sensors 188, 190, the first or second feed motor 178, 179 cycles on and off as necessary to maintain deflection of the filament 126 within the first buffer volume 164.

Referring again to FIG. 9, in another aspect of the present disclosure, a machine for manufacturing additive printed parts from a polymer material is shown generally at 210. The machine 210 includes a housing 212 within which components of the machine 210 are supported. The machine 210 includes a print head 214 that is moveable two-dimensionally in a horizontal plane along an x-axis 216 and a y-axis 218 within the housing 212.

Referring to FIG. 2, The print head is shown generally at 214. The print head 214 includes an extruder 220 and a nozzle 222. The extruder 220 includes a print head feed motor 224 and is adapted to pull a filament of polymer material 226 into the print head 214. The extruder 220 then feeds the filament 226 to the nozzle 222. The nozzle 222 includes a heater 228 that melts the filament 226 as it enters the nozzle 222. The nozzle 222 also includes a tip 230 adapted to feed molten polymer material out of the nozzle 222 to be deposited when an additive printed part is being created. Continual feeding of the filament 226 into the nozzle 222 by the extruder 220 pushes the molten polymer material through the tip 230 of the nozzle 222 to be deposited.

Referring again to FIG. 9, a build table 232 is supported below the print head 214 and is vertically movable up and down along a z-axis 234. The build table 232 also includes a print bed 236. The print bed 236 provides a surface onto which an additive printed part is created within the machine 210. When the machine 210 is used to create an additive printed part, the build table 232 starts out positioned high within the machine 210 near the print head 214. The print head 214 moves back and forth two dimensionally along the x-axis 216 and y-axis 218 depositing molten polymer material onto the print bed 236 and creating a two-dimensional shape on the print bed 236. Once fed from the tip 230 of the nozzle 222 the molten polymer material quickly hardens sufficiently to hold shape. The build table 232 gradually moves downward along the z-axis 234 away from the print head 214 as successive layers of molten material are deposited on previously deposited layers of hardened polymer material. The print head 214 continues to add successive layers onto the forming additive printed part until a final three-dimensional shape is formed.

The machine 210 can create additive printed parts from different kinds of polymer material. The filament 226 can have varying size, color and material composition. The filament 226 that the machine 210 uses comes coiled onto a spool 238, as shown in FIG. 3. Referring to FIGS. 9 and 4, a first filament cartridge 240 supports a spool 238 of filament 226 so the filament 226 can be fed into the machine 210 to the print head 214. A second filament cartridge 241, identical to the first filament cartridge 240, supports an identical spool 238 of filament 226 so the filament 226 can be fed into the machine 210 to the print head 214. The spools 238 are rotatably supported within the first and second filament cartridges 240, 241. FIG. 4 shows the interior of the first and second filament cartridges 240, 241 with an empty spool 238 supported therein. The first and second filament cartridges 240, 241 each include an opening 242 formed therein to allow the filament 226 to extend out. The spool 238 is supported co-axially on a hub 244. The hub 244 is rotatably supported to allow both the hub 244 and the spool 238 supported on the hub 244 to rotate about a center axis 246. Preferably, the hub 244 is supported in a manner that allows the hub 244 and spool 238 to freely rotate. In the first and second filament cartridges 240, 241 as shown in FIG. 4, the hub 244 is supported within the each of the first and second filament cartridges 240, 241 by a bearing 248. Free rotation of the hub 244 within each of the first and second filament cartridges 240, 241 is important to ensure the filament 226 can easily unwind from the spool 238 and minimize the amount of force necessary to pull the filament 226 from the first and second filament cartridges 240, 241.

In order to minimize mass and optimize packaging, it is desirable that the print head 214 be as small as possible. The extruder 220 within the print head 214 pulls the filament 226 from the first and second filament cartridges 240, 241 into the print head 214 and feeds the filament 226 to the nozzle 222. Because the print head 214 must be small, the extruder 220 is also relatively small. Therefore, it is desirable to minimize the force necessary to pull the filament 226 into the print head 214.

A first filament buffer 250 is positioned between the first filament cartridge 240 and the print head 214. A second filament buffer 251, substantially identical to the first filament buffer 250, is positioned between the second filament cartridge 241 and the print head 214. Filament 226 extending from the first filament cartridge 240 passes through the first filament buffer 250 and then on to the print head 214. Filament 226 extending from the second filament cartridge 241 passes through the second filament buffer 251 and then on to the print head 214.

The first filament buffer has a first buffer body 254 and the second filament buffer 251 has a second buffer body 255. The first and second filament buffers 250, 251 are adapted to be stacked on one another. A cover 252 is mounted onto the first buffer body 254 and has a cover face 256 that mates to the first buffer body 254. The first filament buffer 250 has a bottom face 257 that mates to the second buffer body 255.

Each buffer body 254, 255 includes a cavity defined by a first side wall 258, a second side wall 260, and a bottom wall 262 formed therein. When the cover 252 is attached to the first buffer body 254, the first sidewall 258, the second side wall 260, and the bottom wall 262 of the first buffer body 254 and the cover face 256 of the cover 252 define a first buffer volume 264. When the first filament buffer 250 is stacked onto the second filament buffer 251, the first sidewall 258, the second side wall 260, and the bottom wall 262 of the second buffer body 255 and the bottom face 257 of the first buffer body 254 define a second buffer volume 265. The first and second buffer volumes 264, 265 allow the filament 226 passing through the first and second filament buffers 250, 251 to deflect. Deflection of the filament 226 within the filament buffers 264, 265 creates slack in the length of filament 226 between the filament cartridges 240, 241 and the print head 214.

Each of the first and second filament buffers 250, 251 includes a first opening 266 formed at a first distal end 268 and a second opening 270 formed at a second distal end 272. The filament 226 from the first filament cartridge 240 enters the first filament buffer 250 through the first opening 266 of the first filament buffer 250 and exits through the second opening 270 of the first filament buffer 250. The filament 226 from the second filament cartridge 241 enters the second filament buffer 251 through the first opening 266 of the second filament buffer 251 and exits through the second opening 270 of the second filament buffer 251. The first buffer volume 264 is positioned between the first and second openings 266, 270 of the first filament buffer 250. The second buffer volume 265 is positioned between the first and second openings 266, 270 of the second filament buffer 251.

Within each of the first and second buffer volumes 264, 265, the first side wall 258 extends substantially linearly between the first and second openings 266, 270. The second side wall 260 extends between the first and second openings 266, 270 and includes a concave curved shape that allows the filament 226 to deflect in the direction of the second side wall 260 away from the first side wall 258. As the filament 226 extends through the buffer volumes 264, 265 the filament 226 deflects two-dimensionally between a first position 274 and a second position 276. In the first position 274, the filament 226 extends along a substantially linear path between the first and second openings 266, 270 adjacent the first side wall 258. In the second position 276, the filament 226 extends along a curved path between the first and second openings 266, 270 adjacent the second side wall 260.

When the filament 226 deflects to the second position 274, there is slack in the filament 226, adding to the length of filament 226 within the buffer volumes 264, 265. The distance traveled by the filament 226 between the first and second openings 266, 270 when the filament 226 is adjacent the first side wall 258 is shorter than the distance travelled by the filament 226 between the first and second openings 266, 270 when the filament 226 is adjacent the second side wall 260. When the extruder 220 within the print head 214 pulls the filament 226 into the print head 214, the extruder 220 must pull with enough force to overcome the frictional resistance on the filament 226 upstream of the extruder 220. This can be particularly problematic if the spools 38 of coiled filament are very large. The extruder 220 within the print head 214 must pull with enough force to rotate the spools 238 and un-wind the filament 226 from the coils. If the force is too much, the extruder 220 may not be able to pull with enough force to overcome the frictional resistance on the filament 226. If this happens, the machine 210 will stop functioning. Alternatively, if the resistance is too much, the print head feed motor 224 within the extruder 220 may strip the surface of the filament 226 causing slippage in the extruder 220. Either instance results in a disruption in the operation of the machine 210.

Within each of filament buffers 250, 251, if the filament 226 is deflected away from the first side wall 258 toward the second position 276 within the buffer volume 264, 265, there is slack in the filament 226 within the buffer volume 264, 265. This slack provides a free length of filament 226 within the buffer volume 264, 265 that can be pulled from the buffer volume 264, 265 with little resistance. When the filament 226 is deflected away from the first side wall 258 and there is slack in the filament 226 within the buffer volume 264, 265, the force necessary to pull the filament 226 into the extruder 220 within the print head 214 is not affected by any frictional resistance applied to the filament 226 up-stream of the buffer volume 264, 265.

A first feed motor 278 is mounted within and integral to the first filament buffer 250. A second feed motor 279 is mounted within and integral to the second filament buffer 251. The buffer body 254, 255 of each filament buffer 250, 251 includes a cavity 280 within which the first and second feed motors 278, 279 are positioned, and the cover 252 is formed to provide a housing 282 for the first and second feed motors 278, 279.

The first feed motor 278 pulls the filament 226 from the first filament cartridge 240 and into the first opening 266 of the first filament buffer 250 and pushes the filament 226 into the first buffer volume 264. The second feed motor 279 pulls the filament 226 from the second filament cartridge 241 and into the first opening 266 of the second filament buffer 251 and pushes the filament 226 into the second buffer volume 265. The feed motors 278, 279 pull the filament from the filament cartridges 240, 241 and push the filament 226 into the buffer volumes 264, 265 faster than the extruder 220 pulls the filament 226 from the first and second filament buffers 250, 251. Because the filament 226 is coming into the buffer volume 264, 265 faster than the filament 226 is exiting the buffer volume 264, 265, the filament 226 is forced to deflect within the buffer volume 264, 265.

The buffer body 254, 255 of each of the first and second filament buffers 250, 251 includes two sensor pockets 284, 286. A first sensor pocket 284 is formed within the first side wall 258 of each buffer volume 264, 265. A second sensor pocket 286 is formed within the second side wall 260 of each buffer volume 264, 265. The sensor pockets 284, 286 are adapted to support a sensor 288, 290 to detect the presence of the filament 226. A first sensor 288 is supported within the first sensor pocket 284 within each buffer body 254, 255. A second sensor 290 is supported within the second sensor pocket 286 within each buffer body 254, 255. The sensors 288, 290 can be mechanical, wherein each sensor 288, 290 includes a mechanical switch 292 extending into the buffer volume 264, 265 that is triggered when the filament 226 comes into physical contact with the mechanical switch 292. Alternatively, the sensors 288, 290 can be optical sensors that are triggered when the filament 226 is near the sensor 288, 290.

The sensors 288 provide feedback to allow proper control of the machine 210. The machine 210 runs optimally when the filament 226 extending through the first and second filament buffers 250, 251 is deflected within the first and second buffer volumes 264, 265. Deflection is accomplished due to the feed motors 278, 279 pushing the filament 226 into the buffer volumes 264, 265 faster than the filament 226 is being pulled from the filament buffers 250, 251. The sensors 288, 290 detect the presence of the filament 226 within the buffer volumes 264, 265 and provide that information to the controls of the machine 210.

When the filament 226 is being pulled from the first filament cartridge 240, and is not deflected within the first buffer volume 264, the first sensor 288 will detect the filament 226 adjacent the first side wall 258. If the first sensor 288 detects the presence of the filament 226, the first feed motor 278 is turned on. The first feed motor 278 feeds filament 226 into the first buffer volume 264 faster than the filament 226 is being pulled from the first buffer volume 264 causing the filament 226 to deflect. When the filament 226 has fully deflected within the first buffer volume 264, the filament 226 will trigger the second sensor 290. When the second sensor 290 is triggered, the first feed motor 278 is turned off. As the machine 210 continues to operate, the extruder 220 in the print head 214 pulls filament 226 from the first filament buffer 250, taking up the slack in the filament 226 and causing less deflection of the filament 226. When all slack in the filament 226 is gone, the filament 226 is no longer deflected and is adjacent the first side wall 258. When the first sensor 288 once again detects that the filament 226 is adjacent the first side wall 258, the first feed motor 278 is once again turned on. This cycle is repeated as the machine 210 operates. With feedback from the first and second sensors 288, 290 within the first buffer body 254, the first feed motor 278 cycles on and off as necessary to maintain deflection of the filament 226 within the first buffer volume 264 whenever the filament 226 is being pulled from the first filament buffer 250.

When the filament 226 is being pulled from the second filament cartridge 241, and is not deflected within the second buffer volume 265, the first sensor 288 will detect the filament adjacent the first side wall 258. If the first sensor 288 within the second buffer body 255 detects the presence of the filament 226, the second feed motor 279 is turned on. The second feed motor 279 feeds filament 226 into the second buffer volume 265 faster than the filament 226 is being pulled from the second buffer volume 265 causing the filament to deflect. When the filament 226 has fully deflected within the second buffer volume 265, the filament 226 will trigger the second sensor 290 within the second buffer body 255. When the second sensor 290 is triggered, the second feed motor 279 is turned off. As the machine 210 continues to operate, the extruder 220 in the print head 214 pulls filament 226 from the second filament buffer 251, taking up the slack in the filament 226 and causing less deflection of the filament 226. When all slack in the filament 226 is gone, the filament 226 is no longer deflected and is adjacent the first side wall 258. When the first sensor 288 once again detects that the filament 226 is adjacent the first side wall 258, the second feed motor 279 is once again turned on. This cycle is repeated as the machine 210 operates. With feedback from the first and second sensors 288, 290 within the second buffer body 255, the second feed motor 279 cycles on and off as necessary to maintain deflection of the filament 226 within the second buffer volume 265 whenever the filament 226 is being pulled from the second filament buffer 251.

Figure 10C:
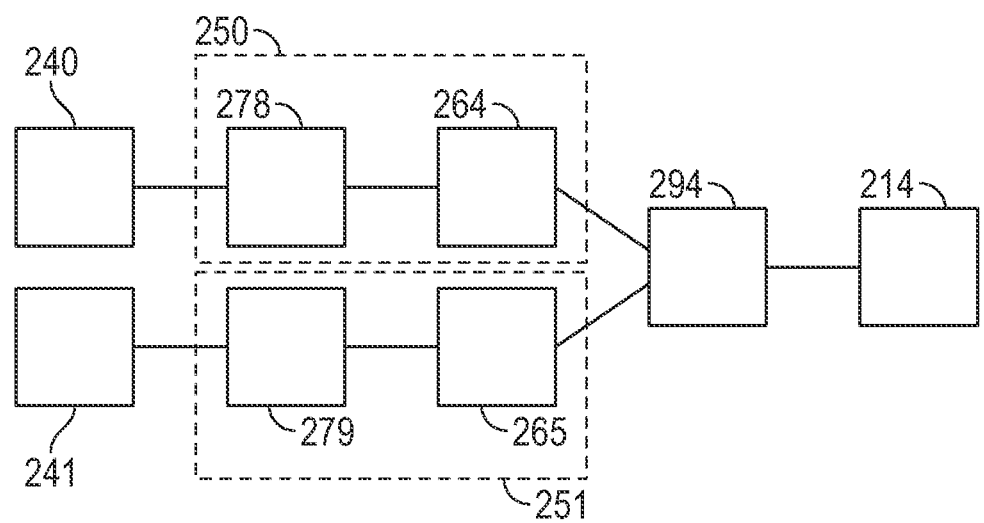

A filament intersection 294 is positioned between the first and second filament buffers 250, 251 and the print head 214. The first feed motor 278 pulls filament 226 from the first filament cartridge 240 and feeds the filament 226 through the first filament buffer 250 to the filament intersection 294. The second feed motor 279 pulls filament 226 from the second filament cartridge 241 and feeds the filament 226 through the second filament buffer 251 to the filament intersection 294. FIG. 10C is a schematic representation of the path the filament 226 takes through the machine 210.

The filament intersection 294 is adapted to alternatively allow filament 226 from the first and second filament buffers 250, 251 to be fed to the print head 214. Filament 226 can only be fed to the print head 214 from one of the filament buffers 250, 251. The filament intersection 294 allows the filament 226 to be pulled from one of either the first filament buffer 250 or the second filament buffer 251. This provides the ability to have more filament readily available to the machine 210. When the filament 226 from the first filament cartridge 240 runs out, the filament intersection 294 can switch over to pull filament from the second filament buffer 251 and second filament cartridge 241 with minimal interruption to the machine 210.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A machine for manufacturing additive printed parts, comprising:
   a first filament cartridge;
   a print head moveably supported within the machine, the print head including an extruder and a nozzle;
   a first filament buffer positioned between the first filament cartridge and the print head, the first filament buffer including a first buffer volume, a first opening, and a second opening, wherein the first buffer volume is defined by a first buffer body, and a cover mate-able to the first buffer body, the first buffer body including a cavity, the cavity defined by a first side wall, a second side wall, and a bottom wall, the first side wall extending substantially linearly between the first opening and the second opening, and the second side wall extending between the first opening and the second opening, the second side wall exhibiting a concave curved shape; and
   a first feed motor mounted within and integral to the first filament buffer and positioned between the first filament cartridge and the first buffer volume.

2. The machine of claim 1, wherein the second side wall beginning near the first opening slopes sharply away from the first side wall.

3. The machine of claim 1, wherein the distance of the first side wall between the first and second openings is shorter than the distance of the second side wall between the first and second openings.

4. The machine of claim 1, further comprising a first sensor and a second sensor mounted within the first filament buffer, wherein the first sensor is positioned adjacent the first side wall within the first buffer volume and the second sensor is positioned adjacent the second side wall within the first buffer volume.

5. The machine of claim 1, further including a spool rotatably mounted within the first filament cartridge, the spool adapted to support a coiled length of filament and to rotate freely to allow filament to un-wind from the coil and to be pulled from the first filament cartridge.

6. The machine of claim 1 further comprising a second filament cartridge, a second feed motor mounted within and integral to the first filament buffer and positioned between the second filament cartridge and the first buffer volume, and a filament intersection positioned between the first and second feed motors and the first buffer volume of the first filament buffer.

7. The machine of claim 1, further comprising a second filament cartridge, and a second filament buffer positioned between the second filament cartridge and the print head and having a second buffer volume, wherein the filament supported within the second filament cartridge extends from the second filament cartridge, through the second filament buffer, and to the print head.

8. The machine of claim 7, further including a second feed motor mounted within and integral to the second filament buffer and positioned between the second filament cartridge and the second buffer volume.

9. The machine of claim 8, wherein the second filament buffer includes a first opening and a second opening.

10. The machine of claim 9, further comprising a filament intersection positioned between the first and second filament buffers and the print head.

11. The machine of claim 10, wherein the second buffer volume is positioned between the first and second openings of the second filament buffer and includes a first sidewall and a second side wall.

12. The machine of claim 11, wherein the first side wall of the second buffer volume extends substantially linearly between the first and second openings of the second filament buffer and the second side wall of the second buffer volume extends between the first and second openings of the second filament buffer.

13. The machine of claim 12, wherein the distance of the first side wall of the second buffer volume between the first and second openings of the second filament buffer is shorter than the distance of the second side wall of the second buffer volume between the first and second openings of the second filament buffer.

14. The machine of claim 13, further comprising a first sensor and a second sensor mounted within the second filament buffer.

15. The machine of claim 14, further comprising a spool rotatably mounted within the second filament cartridge and adapted to support a coiled length of the filament and to rotate freely.

16. The machine of claim 4, further comprising a first sensor pocket supporting the first sensor formed within the first side wall and a second sensor pocket supporting the second sensor formed in the second side wall.

17. The machine of claim 16, wherein the first sensor and the second sensor are optical sensors.

18. The machine of claim 1, wherein the feed motor is positioned within the cavity.

* * * * *